United States Patent [19]

Lee et al.

[11] 3,915,698
[45] Oct. 28, 1975

[54] STABILIZATION OF MANGANESE BISMUTH IN THE HIGH TEMPERATURE PHASE

[75] Inventors: Kenneth Lee, Saratoga; George Bryan Street, Palo Alto; James Carr Suits, Saratoga, all of Calif.

[73] Assignee: International Business Machines Corporation, Armonk, N.Y.

[22] Filed: Aug. 14, 1974

[21] Appl. No.: 497,442

[52] U.S. Cl. .............................. 75/134 D; 75/134 M
[51] Int. Cl.² .......................................... C22C 12/00
[58] Field of Search ...................... 75/134 D, 134 M

[56] References Cited
UNITED STATES PATENTS

| 2,576,679 | 11/1951 | Guillaud | 75/134 D |
| 2,804,415 | 8/1957 | Boothby et al. | 148/103 |
| 2,825,670 | 3/1958 | Adams et al. | 148/103 |
| 2,865,085 | 12/1958 | Cornish | 75/134 D |
| 3,837,908 | 9/1974 | Lewicki et al. | 117/239 |

FOREIGN PATENTS OR APPLICATIONS

| 673,882 | 11/1963 | Canada | 75/134 D |

Primary Examiner—L. Dewayne Rutledge
Assistant Examiner—E. L. Weise
Attorney, Agent, or Firm—Joseph G. Walsh

[57] ABSTRACT

Manganese bismuth is stabilized in the high temperature (Beta) phase by the addition of small amounts of either rhodium or ruthenium.

6 Claims, No Drawings

STABILIZATION OF MANGANESE BISMUTH IN THE HIGH TEMPERATURE PHASE

FIELD OF THE INVENTION

The present invention is concerned with stabilizing manganese bismuth in the high temperature phase. When stabilized in this phase, the material is useful for thermomagnetic recording.

PRIOR ART

Manganese bismuth is well known for use in thermomagnetic recording. The binary compound MnBi is known to exist in two crystallographic phases. The low temperature $\alpha$ phase, which has the NiAs crystal structure, is stable below 360°C, and the high temperature $\beta$ phase, which has a distorted NiAs crystal structure, is stable above 360°C. The $\alpha$ phase was the first material used to demonstrate thermomagnetic recording and its magneto-optical properties have been studied extensively. For most thermomagnetic applications, the $\beta$ phase is more attractive because this phase requires only about one-fourth of the writing energy necessary for the $\alpha$ phase. The principal problem associated with the $\beta$ phase is that it tends to convert to the more stable $\alpha$ phase upon thermal cycling. Stabilization of the $\beta$ phase is therefore an important problem. The present application solves this problem by the addition of Rh or Ru to MnBi.

SUMMARY OF THE INVENTION

According to the present invention, MnBi is stabilized in the high temperature or $\beta$ phase by incorporating in it a small but effective amount of either Rh or Ru, preferably Rh.

We have found that 1 at. % Rh or 1 at. % Ru in bulk MnBi increases the minimum time constant of pure MnBi by about five orders of magnitude. When working with film, higher doping levels should preferably be used (>6at. %). This is probably due to the tendency for the dopant to go into grain boundaries and other defects in the film rather than into the lattice itself.

The mechanism by which Rh or Ru inhibits the $\beta \rightarrow \alpha$ transformation is not established. However, since the equilibrium transformation temperature for $\beta \rightarrow \alpha$ is substantially lowered by the addition of 1 at. % Rh, it is clear that the dopant is entering the lattice and not simply going into second phases and grain boundaries. The compound RhBi exists only over a composition range of cation deficiency, which implies that the dopant atom in MnBi is occupying the octahedral site rather than the bipyramidal interstitial site. Since the lattice constants for RhBi are smaller than for MnBi, when Rh goes into this octohedral site, large distortions will occur. This distortion may inhibit the movement of Mn between the interstitial and octahedral sites which occurs during the $\beta \rightarrow \alpha$ transformation.

The following examples are given solely for purpose of illustration and are not to be considered as limitations of the present invention, many variations of which are possible without departing from the spirit or the scope thereof.

EXAMPLE I

The thin films are prepared by evaporating Bi first onto fused quartz substrates which are maintained at 50°C. Then the Mn and Rh are simultaneously evaporated onto the Bi film. The films are coated with 0.5$\mu$m of SiO, and then vacuum annealed. It was found that nearly phase pure (as determined by X-ray analysis) $\beta$ phase films can be prepared by annealing for 6 hours in the range 300°–325°C where the nominal composition is $Mn_{0.82}Rh_{0.18}Bi$. The specific polar Faraday rotation at room temperature and at $\lambda=0.6328\mu m$ is $2 \times 10^5$ deg/cm, which may be compared to a value of $4 \times 10^5$ deg/cm for undoped $\beta$-MnBi. Films of $\beta$-MnBi of the above composition were isothermally annealed at 150°C, 200°C, and 250°C. These temperatures are higher than that necessary for thermal magnetic writing on $\beta$-MnBi. Annealing times in the range $10^4$–$10^6$ seconds showed no evidence at all of any $\beta \rightarrow \alpha$ transformation. Pure MnBi films show approximately 30% conversion in times of 3 to 100 seconds when annealed in this same temperature range. The procedure may be repeated using Ru instead of Rh, with analogous results.

EXAMPLE II

The bulk samples are made from the pure elements by induction melting at 1000°C in a BN crucible under an atmosphere of He. The molten mixture is quenched by pouring it onto a liquid nitrogen cooled copper block. The sample is then powdered and reacted at 300°C for several days. Using this technique it was possible to obtain phase pure samples of $Mn_{1.1}Bi$. It was also possible to obtain phase pure samples of $Mn_{1.1-x}Rh_xBi$ for $x=0.01$ and 0.02. Higher values of $x$ resulted in free Bi. Samples which were additionally heated to 375°C, followed by quenching, were predominantly $\beta$-MnBi but some $\alpha$-MnBi was always present.

These samples with $x=0.02$ were then annealed at various temperatures, and examination by X-ray diffraction showed that above 329°C $\beta$-MnBi would grow at the expense of the $\alpha$-MnBi, whereas below 324°C the reverse was true. The phase transformation temperature is thus lowered from 360°C to 324°–329°C by the addition of Rh. This was confirmed by DTA measurements.

What is claimed is:

1. Manganese bismuth stabilized in the beta phase by the inclusion of a small but effective amount of either rhodium or ruthenium.

2. Manganese bismuth stabilized in the beta phase by the inclusion of at least 1 atomic percent of either rhodium or ruthenium.

3. Manganese bismuth stabilized in the beta phase by the inclusion of at least 6 atomic percent of either rhodium or ruthenium.

4. A thermomagnetic recording medium comprising manganese bismuth stabilized in the beta phase by the inclusion of a small but effective amount of either rhodium or ruthenium.

5. A thermomagnetic recording medium comprising manganese bismuth stabilized in the beta phase by the inclusion of at least 1 atomic percent of either rhodium or ruthenium.

6. A thermomagnetic recording medium comprising manganese bismuth stabilized in the beta phase by the inclusion of at least 6 atomic percent of either rhodium or ruthenium.

* * * * *